United States Patent [19]
Primeaux, II et al.

[11] Patent Number: 5,962,618
[45] Date of Patent: *Oct. 5, 1999

[54] POLYUREA SPRAY RAILCAR LINING SYSTEMS

[75] Inventors: Dudley J. Primeaux, II, Elgin; Kenneth C. Anglin, Austin, both of Tex.

[73] Assignee: Huntsman Petrochemical Corporation, Austin, Tex.

[*] Notice: This patent is subject to a terminal disclaimer.

[21] Appl. No.: 09/040,120

[22] Filed: Mar. 17, 1998

Related U.S. Application Data

[63] Continuation of application No. 08/632,825, Apr. 16, 1997, Pat. No. 5,731,397.

[51] Int. Cl.$^6$ ................................................. C08G 18/10
[52] U.S. Cl. ............................... 528/61; 528/28; 528/32; 528/38; 528/64; 528/65; 528/73; 528/75
[58] Field of Search .................................. 528/28, 32, 38, 528/61, 64, 65, 73, 75

[56] References Cited

U.S. PATENT DOCUMENTS

| | | | |
|---|---|---|---|
| 4,206,299 | 6/1980 | Yamazaki et al. | 528/288 |
| 4,448,904 | 5/1984 | Dominguez | 521/160 |
| 4,801,674 | 1/1989 | Scott, Jr. et al. | 528/68 |
| 5,124,426 | 6/1992 | Primeaux, II et al. | 528/60 |
| 5,266,671 | 11/1993 | Primeaux, II et al. | 528/68 |
| 5,317,076 | 5/1994 | Primeaux, II et al. | 528/61 |
| 5,350,778 | 9/1994 | Steppan et al. | 521/159 |
| 5,442,034 | 8/1995 | Primeaux et al. | 528/60 |
| 5,731,397 | 3/1998 | Primeaux et al. | 528/73 |

OTHER PUBLICATIONS

D. J. Primeaux, II, "Spray Polyurea Versatile High Performance Elastomer for the Polyurethane Industry," *Polyurethanes* 89, Proceedings of the SPI 32$^{nd}$ Annual Technical/Marketing Conference, 1989, pp. 1216–130.

*Organofunctional Silanes*, Union Carbide, 1991.

G. H. Brevoort, "Current Trends and Issues in Railcar Painting and Lining," *Journal of Protective Coatings and Linings*, Dec., 1991.

"Union Carbide® Organofunctional Silanes Products and Applications," Product Information Bulletin, Union Carbide Corporation, Mar., 1993.

"Union Carbide® Organofunctional Silanes for Coatings," Product Information Bulletin, Union Corporation, May, 1993.

D. J. Weinmann, "Solventless Epoxy Coatings for the Rail Car Industry," *Materials Processing*, Jun., 1994, pp. 29–32.

G.L. Witucki; "Using Alkoxy Silanes for Optimum Coating Adhesion and Durability," *Materials News*, pp. 8–9, Apr., 1994.

*Primary Examiner*—Rachel Gorr
*Attorney, Agent, or Firm*—Jones, O'Keefe, Egan & Peterman

[57] ABSTRACT

Spray polyurea elastomer systems have improved adhesion to a substrate with the incorporation of a functional alkoxy silane and water. Such systems typically also include a quasi-prepolymer of an isocyanate and an active hydrogen-containing material, and at least one amine resin, and preferably an amine-terminated chain extender. The system may also benefit from the incorporation of a higher than usual proportion of 2,4'-isomer methylene diisocyanate (MDI). The viscosity of the various components, as well as various processing characteristics, may be improved by the addition of an alkylene carbonate. The spray polyurea elastomer systems of this invention also have improved abrasion and impact resistance.

17 Claims, No Drawings

POLYUREA SPRAY RAILCAR LINING SYSTEMS

This application is a continuation of Ser. No. 08/632,825 filed Apr. 16, 1997, U.S. Pat. No. 5,731,397.

FIELD OF THE INVENTION

The invention relates to aliphatic and aromatic spray polyurea elastomers and processes for making the same, and, in one aspect, more particularly relates to methods and compositions for making aliphatic and aromatic spray polyurea elastomers having improved adhesion, improved abrasion resistance, and improved impact resistance, particularly for the interior lining of railcars.

BACKGROUND OF THE INVENTION

Spray elastomer systems are commonly recognized as coating materials, with aliphatic and aromatic isocyanate spray polyurea elastomer systems being particularly useful when employed in this capacity. This two-component technology is based on an isocyanate quasi-prepolymer and an amine coreactant, often an amine resin blend.

It is further known to use coatings as liners on the inside of railcars. Such coatings should be highly conformant to the interior surface of the railcar and should have excellent adhesion to the interior surface during the frequent loading and unloading cycles railcars are subject to. Increasingly strict environmental regulations continue to reduce the volatile organic compound (VOC) emissions permitted during the application of such coatings. These requirements have forced the coatings to have higher solids and lower solvent contents and/or be entirely water-based systems.

The following excerpt from G. H. Brevoort, "Current Trends and Issues in Railcar Painting and Lining," *Journal of Protective Coatings and Linings*, December, 1991, is instructive.

"Without a doubt, the driving force in the past decade to develop high solids, improved protective coatings and linings with reduced VOCs has come from The Clean Air Act and its amendments.

"Some residual benefits accrue from the use of high solids, VOC-conformant coatings and linings. For example, the number of gallons required is fewer, which results in fewer containers to ship, handle, open, apply and dispose of. While the price per gallon is higher, the contents per container are greater and go further so that fewer gallons are required. Much less solvent is being packaged, shipped and emitted. Often, the actual material cost for a job is reduced with more concentrated, high-solids products. Most important, many in the industry, including individual users, are being environmentally responsible.

"It is not easy to formulate high solids, VOC-conformant coatings and linings. Solvents are not just removed and replaced with more solids. Among the problems encountered are maintaining suspension of the mixed products (non-settling), maintaining their application and handling characteristics, producing coatings with the ability to build adequate drying and recoating times for practical use. Leveling of the applied coating film to create a smooth appearance has been particularly difficult to achieve."

There is thus a continuing need to develop new systems to address the varied requirements of the railcar industry. Various known polyurea systems have been employed which address these parameters.

For example, U.S. Pat. No. 5,266,671 to Dudley J. Primeaux, II of Huntsman Corporation describes a spray polyurea elastomer which exhibits improved resistance to abrasion. The elastomer includes an isocyanate, an amine terminated polyoxyalkylene polyol, a chain extender and a chemically sized filler material. The isocyanate is preferably a quasi-prepolymer of an isocyanate and a material selected from at least one polyol, a high molecular weight polyoxyalkyleneamine or a combination thereof. A method for making a spray polyurea elastomer which is substantially resistant to abrasion is also disclosed.

Spray polyurea elastomers made from an (A) component and a (B) component, where the (A) component has a quasi-prepolymer made from an isocyanate and an active hydrogen-containing material, such as a polyoxyalkylenepolyamine, is described in U.S. Pat. No. 5,442,034 to Dudley J. Primeaux, II of Huntsman Corporation. The (B) component includes an amine resin, such as an amine-terminated polyoxyalkylene polyol which may be the same or different from the polyoxyalkylene polyamine of the quasi-prepolymer. The viscosity of the (A) component is reduced by the inclusion of an organic, alkylene carbonate, such as ethylene carbonate, propylene carbonate, butylene carbonate, dimethyl carbonate and the like. The alkylene carbonate also serves as a compatibilizer between the two components, thus giving an improved mix of the system.

SUMMARY OF THE INVENTION

Accordingly, it is an object of the present invention to provide a spray polyurea elastomer system which can be directly applied to a substrate such as the interior of a railcar.

It is another object of the present invention to provide a spray polyurea elastomer system which has excellent adhesion to the substrate over which it is applied.

Another object of the invention is to provide a spray polyurea elastomer system which has excellent flexibility and elongation when applied to railcars to withstand the constant flexing railcars are subject to.

In carrying out these and other objects of the invention, there is provided, in one form, a spray polyurea elastomer having a quasi-prepolymer of an isocyanate and an active hydrogen-containing material; at least one amine resin; at least one amine-terminated chain extender; a functional alkoxy silane as an adhesion promoter and water.

DETAILED DESCRIPTION OF THE INVENTION

It has been discovered that lining the inside of railcars and/or tank cars can be performed by the application of a particular polyurea spray elastomer system. In one embodiment of the invention, the system may be prepared by mixing an isocyanate component with a resin blend component, a blend of polyoxyalkylene diamines and/or triamines and amine-terminated chain extenders, in high pressure impingement mix spray equipment and can be directly applied to a prepared substrate. A functional alkoxy silane is also included as an adhesion promoter. The polyurea elastomer has excellent flexibility and elongation to withstand the constant flexing inside the railcars as they roll down the tracks. The superior abrasion and impact resistance of the polyurea elastomer system will allow for faster railcar product loading and unloading, as well as an extended service life. The fast reactivity and cure of the polyurea spray systems will allow for increased cycle times in railcar rehabilitation. Faster product loading cycles into and out of the lined cars can also be achieved.

The polyurea spray elastomer systems of this invention contain no solvents and thus have little or no VOCs. They are thus considered 100% solids systems to comply with VOC requirements. The resulting elastomers are also highly flexible and abrasion/impact resistant. The polyurea spray systems additionally have excellent high temperature resistance, allowing the cars to be loaded with hot materials, and to allow for steam cleaning. By contrast, epoxy and polyurethane systems will not hold up to high temperatures. Polyurea spray systems cure rapidly even under low ambient temperature conditions. Their fast reactivity additionally allows for uniform coating and film build over the sand blasted texture steel substrates. Polyurea systems further remain flexible over weld seams with no cracking.

The aliphatic and/or aromatic spray polyurea elastomer system of the present invention typically includes an isocyanate, which may be an aliphatic or aromatic isocyanate. The aliphatic isocyanates are known to those in the art. Thus, for instance, the aliphatic isocyanates may be of the type described in U.S. Pat. No. 4,748,192, incorporated by reference herein. Accordingly, they are typically aliphatic diisocyanates, and more particularly are the trimerized or the biuretic form of an aliphatic diisocyanate, such as, hexamethylene diisocyanate; or the bifunctional monomer of the tetraalkyl xylene diisocyanate, such as tetramethyl xylene diisocyanate. Cyclohexane diisocyanate is also to be considered a preferred aliphatic isocyanate. Other useful aliphatic polyisocyanates are described in U.S. Pat. No. 4,705, 814, also incorporated by reference herein. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3- and 1,4-cyclohexane diisocyanate as well as any desired mixture of these isomers; 1-isocyanato-3,3,5-trimethyl-5-isocyanatomethylcyclohexane (isophorone diisocyanate); 4,4'-, 2,2'- and 2,4'-dicyclohexylmethane diisocyanate, as well as the corresponding isomer mixtures, and the like.

Aromatic isocyanates may also be employed. Suitable aromatic polyisocyanates include, but are not necessarily limited to m-phenylene diisocyanate; p-phenylene diisocyanate; polymethylene polyphenylene diisocyanate; 2,4-toluene diisocyanate; 2,6-toluene diisocyanate; dianisidine diisocyanate; bitolylene diisocyanate; naphthalene-1,4-diisocyanate; diphenylene 4,4'-diisocyanate and the like. Suitable aliphatic/aromatic diisocyanates, include, but are not necessarily limited to xylylene-1,3-diisocyanate; bis(4-isocyanatophenyl)methane; bis(3-methyl-4-isocyanatophenyl)methane; and 4,4'-diphenylpropane diisocyanate. The aforestated isocyanates can be used alone or in combination. In one embodiment of the invention, aromatic isocyanates are preferred.

In one embodiment of the invention herein, it is preferred to increase the proportion of 2,4'-methylene diisocyanate isomer beyond that normally used. Normally, one is not concerned with the isomer proportions, but in this case, it is preferred that of the methylene diisocyanate (MDI) proportion, at least 30% is of the 2,4'-isomer, and that preferably, at least 50% is of the 2,4'-isomer. The higher 2,4'-isomer content produces a more flexible elastomer railcar liner.

Care should be taken in expressing the 2,4'-isomer content correctly, by expressing the basis for the content proportion. For a non-limiting example, in a polyurea elastomer system of this invention, if the isocyanate component (typically a quasi-prepolymer of an isocyanate, e.g. MDI, and a polyol; sometimes termed an (A) component) is a quasi-prepolymer based on MONDUR® ML (50 pbw) and JEFFOX® PPG-2000 (50 pbw), then 56% of the MDI (proportion in neat MONDUR ML) would be the 2,4'-isomer, within the range noted in the paragraph above. Considering the total isocyanate component (quasi-prepolymer) as the basis, 28% of the component would be the 2,4'-isomer. For the total spray polyurea elastomer system, the 2,4'-isomer component would be about 14%. Thus, in one embodiment of the invention, if the isocyanate used in the quasi-prepolymer has 30% 2,4'-isomer of MDI, the total proportion of the 2,4'-isomer in the spray elastomer system must be at least 7.5%. If the isocyanate used in the quasi-prepolymer has 50% 2,4'-isomer of MDI (e.g. one different than that mentioned in the previous sentence), the total proportion of the 2,4'-isomer in the spray elastomer system must be at least 12.5%.

In the practice of the present invention, it is expected that the isocyanate will be at least partially reacted with an active hydrogen-containing material, in most cases, to form a quasi-prepolymer, although this is not an absolute requirement. However, if a quasi-prepolymer of relatively high viscosity is used, an alkylene carbonate may be used as a reactive diluent which lowers the viscosity of the quasi-prepolymer.

The active hydrogen-containing materials may include, but are not necessarily limited to polyols, high molecular weight polyoxyalkyleneamine, also described herein as amine-terminated polyethers, or a combination thereof.

The polyols include, but are not limited to, polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. Other high molecular weight polyols which may be useful in this invention are polyesters of hydroxyl-terminated rubbers, e.g., hydroxyl-terminated polybutadiene. Hydroxyl-terminated quasi-prepolymers of polyols and isocyanates are also useful in this invention.

Especially preferred are amine-terminated polyether polyols, including primary and secondary amine-terminated polyether polyols of greater than 1,500 average molecular weight having from about 2 to about 6 functionality, preferably from about 2 to about 3, and an amine equivalent weight of from about 750 to about 4,000. Mixtures of amine-terminated polyethers may be used. In a preferred embodiment, the amine-terminated polyethers have an average molecular weight of at least about 2,500. These materials may be made by various methods known in the art.

The amine-terminated polyether resins useful in this invention, for example, are polyether resins made from an appropriate initiator to which lower alkylene oxides, such as ethylene oxide, propylene oxide, butylene oxide or mixtures thereof, are added with the resulting hydroxyl-terminated polyol then being aminated. When two or more oxides are used, they may be present as random mixtures or as blocks of one or the other polyether. In the amination step, it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine-terminated polyether resins useful in this invention have greater than 50 percent of their active hydrogens in the form of amine hydrogens. If ethylene oxide is used, it is desirable to cap the hydroxyl-terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which are incorporated by reference herein.

In the practice of this invention, a single high molecular weight amine-terminated polyol may be used. Also, mixtures of high molecular weight amine-terminated polyols, such as mixtures of di- and trifunctional materials and/or different molecular weight or different chemical composition materials, may be used.

Also, high molecular weight amine-terminated polyethers or simply polyether amines are included within the scope of our invention and may be used alone or in combination with the aforestated polyols. The term "high molecular weight" is intended to include polyether amines having a molecular weight of at least about 2000. Particularly preferred are the JEFFAMINE® series of polyether amines available from Huntsman Corporation; they include JEFFAMINE D-2000, JEFFAMINE D4000, JEFFAMINE T-3000 and JEFFAMINE T-5000.

As noted, the spray polyurea elastomer system of this invention may include an organic alkylene carbonate, as defined in U.S. Pat. No. 5,442,034, incorporated by reference herein. As noted therein, in a particular embodiment of the invention, the alkylene carbonates are preferably chosen from the group of ethylene carbonate, propylene carbonate, butylene carbonate and dimethyl carbonate.

It will be appreciated that in one embodiment of the invention, the portion of the spray polyurea elastomer system containing the quasi-prepolymer of an isocyanate and an active hydrogen-containing material is termed the (A) component, whereas the portion of the spray polyurea elastomer system containing the amine resin may be referred to as the (B) component. In one embodiment of the invention, the proportion of alkylene carbonate in the (A) component ranges from about 1 to about 20 percent, preferably from about 5 to 15 percent. These percentages are based on 100 volume parts in the (A) component. The use of the alkylene carbonate reduces the viscosity of the system, particularly the (A) component it resides in prior to mixing. The alkylene carbonate also allows slower effective reactivities in spray polyurea elastomer systems, improved properties and surface characteristics (flowability) and improved adhesion to the surfaces on which the elastomer is sprayed.

The polyurea elastomer systems may also include amine-terminated chain extenders in the formulation, which may preferably be placed within the (B) component. Suitable chain extenders include, but are not necessarily limited to, those aliphatic and cycloaliphatic diamine chain extenders mentioned in U.S. Pat. Nos. 5,162,388 and 5,480,955, incorporated herein by reference. Aromatic diamine chain extenders may also be useful, such as those described in U.S. Pat. No. 5,317,076, incorporated herein by reference. In one embodiment of the invention, aromatic chain extenders are preferred. The amount of amine-terminated chain extender in the total spray polyurea elastomer system of this invention may range from about 10 pbw to about 22.5 pbw in one embodiment; preferably from about 10 pbw to about 20 pbw; and most preferably from about 12.5 pbw to about 20 pbw.

It has further been discovered that the complete polyurea spray railcar lining system also includes a slow cure, hand mixable polyurea spray elastomer system which can be brush applied. This modified system could be used to pre-coat the weld seam areas, as well as the hook points, to insure good coverage inside the compartment. The modified system could also be used for patch repair. Slower reacting systems suitable for patching or other low volume or hand applied applications may be formulated using an amine resin blend having from about 40 wt. % to about 60 wt. % of the blend as amine-terminated chain extender.

An essential ingredient in the spray polyurea elastomers of this invention are functional alkoxy silanes, which have been discovered to be adhesion promoters. The useful functional alkoxy silanes may have a structure such as that seen at (I):

$$R_nSiOR'_{(4-n)} \qquad (I)$$

where:

R is a hydrocarbon moiety containing a functionality selected from the group consisting of epoxy, amine and vinyl;

n is an integer from 1 to 3, although it will be recognized that in a mixture of functional alkoxy silanes n may average from 1 to 3; and R' is a lower, straight chain alkyl group having 1 to 4 carbon atoms.

Note that the definition of the functional alkoxy silanes requires the presence of pendant alkoxy groups. In one embodiment of the invention, it is preferred that epoxy alkoxy silanes are used as it has been discovered that these perform the best at adhesion promotion for the spray polyurea systems of this invention. Early examples of formulations used for adhesion studies indicated that epoxy alkoxy silanes gave the best substrate adhesion. The preference for epoxy alkoxy silanes in the polyurea elastomer systems of this invention could not have been predicted based on known literature about alkoxy silanes. These materials have at least one epoxy or glycidoxy group. One non-limiting example of an epoxy alkoxy silane is shown at (II):

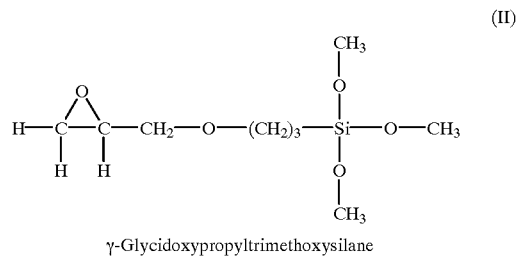

γ-Glycidoxypropyltrimethoxysilane

Examples of this epoxy methoxy silane, include, but are not necessarily limited to, SILQUEST® A-187 sold by OSi Specialties, Inc./Witco; Dow Corning® Z-6040 Silane, sold by Dow Corning and PROCIL® 5136 sold by PCR Inc.

Amino alkoxy silanes may be exemplified, but not necessarily limited to, an amino alkoxy silane such as shown in formula (III):

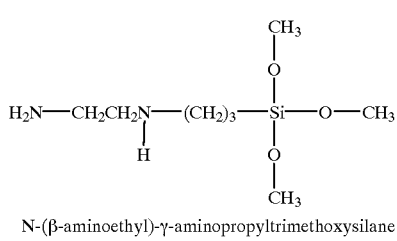

N-(β-aminoethyl)-γ-aminopropyltrimethoxysilane

Examples of this amine methoxy silane, include, but are not necessarily limited to, SILQUEST® A-1120 sold by OSi Specialties, Inc./Witco; Dow Corning® Z-6020 Silane, sold by Dow Corning and PROCIL® 3128 sold by PCR Inc. It will be further appreciated that amine alkoxy silanes suitable for use in this invention are not limited to that of formula (III), nor to amine alkoxy silanes having two amine groups. Suitable amine alkoxy silanes may have only one primary amine group, or only one secondary amine group, or even one tertiary amine group, or combinations of various kinds of amine groups.

Vinyl alkoxy silanes may be exemplified, but not necessarily limited to, a vinyl alkoxy silane such as shown in formula (IV):

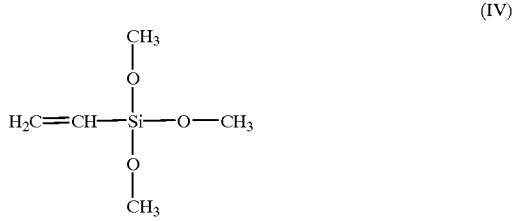

Examples of this vinyl methoxy silane, include, but are not necessarily limited to, SILQUEST® A-171 sold by OSi Specialties, Inc./Witco; and Dow Corning® Q9-6300 Silane, sold by Dow Corning.

One theory about how alkoxy silanes function as adhesion promoters is given by G. L. Witucki in "Using Alkoxy Silanes for Optimum Coating Adhesion and Durability," Material News, March/April, 1994, pp. 8–9. The theory, to which the invention herein is not necessarily limited, involves the epoxy alkoxy silanes first reacting with the amine resin in a simple epoxy-amine reaction. The water is incorporated into the resin blend (e.g. the (B) component) to "activate" the pendant trialkoxy silane groups by converting them to trihydroxy-silanes. When the system is applied to substrates, e.g. railcar interiors, the hydroxy-silane reacts with hydroxyl specie on the substrate surface to form a bond. Small amounts of water and methanol are by-products of this process, which in turn can be consumed by the residual isocyanate groups. It should be noted that the incorporation of a small amount of water into the system does not interfere with the reaction or cause foaming. For these reasons, care should be taken to insure that too much water is not used. The amount of water in the total spray polyurea elastomer system of this invention may range from about 0 pbw to about 0.25 pbw in one embodiment; preferably from about 0.05 pbw to about 0.25 pbw; and most preferably from about 0.01 pbw to about 0.15 pbw.

In one embodiment, the functional alkoxy silane is present in the range of from about 0.1 pbw to about 1.0 pbw, based on the total spray polyurea elastomer, and is preferred to be present in the range of from about 0.15 pbw to about 0.5 pbw. In one embodiment, it is preferred to include the functional alkoxy silane into the (B) component, that is, with the amine resin.

Other conventional formulation ingredients may be employed in the spray polyurea elastomers of this invention, such as, for example, foam stabilizers, also known as silicone oils or emulsifiers. The foam stabilizers may be an organic silane or siloxane. For example, compounds may be used having the formula:

$$RSi[O-(R_2SiO)_n-(oxyalkylene)_mR]_3$$

where R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773, incorporated by reference herein. It should be kept in mind that these silane and siloxane foam stabilizer ingredients are not chemically the same as the functional alkoxy silanes discussed previously which function as adhesion promoters. Note that the formula given immediately above does not require the presence of pendant alkoxy groups, which are essential for the functional alkoxy silanes which function as adhesive promoters in this inventive system.

Pigments, for example titanium dioxide, may be incorporated in the elastomer system to impart color properties to the elastomer. Typically, such pigments are added with the amine resin, for example, in the (B) component.

Reinforcing materials, if desired, useful in the practice of the invention are known to those skilled in the art. For example, chopped or milled glass fibers, chopped or milled carbon fibers and/or mineral fibers are useful.

In one embodiment of the invention, the following broad and preferred ranges for the essential components may be used. All proportions are in pbw, as are the proportions in Table 1.

| Component | Broad proportions | Preferred proportions | Most preferred proportions |
|---|---|---|---|
| Quasi-prepolymer, pbw | 30–70 | 40–60 | 45–55 |
| MDI[1], % | 0–65 | 25–65 | 35–65 |
| Amine resin blend, pbw | 70–30 | 60–40 | 55–45 |
| Functional alkoxy silane[2] | 0.1–2.0 | 0.1–1.0 | 0.3–0.8 |
| Amine chain extender[2] | 20–45 | 20–40 | 25–40 |
| Water[2] | 0–0.5 | 0.1–0.5 | 0.2–0.3 |

[1]The % MDI is the % of the total quasi-prepolymer; the 2,4'-MDI isomer is present in the MDI in a proportion of at least 50%. In one embodiment, the 2,4'-isomer is 17.5%–32.5% of the isocyanate quasi-prepolymer or A-component.
[2]All components are given as wt. % present in the amine resin or B-component.

Post curing of the elastomer is optional. Post curing will improve some elastomeric properties, such as heat sag. Employment of post curing depends on the desired properties of the end product. The (A) component and the (B) component of the present spray polyurea elastomer system are combined or mixed under high pressure; most preferably, they are impingement mixed directly in the high pressure spray equipment itself. In particular, a first and second pressurized stream of components, such as components (A) and (B), respectively, are delivered from separate chambers of the proportioner and are impacted or impinged upon each other at high velocity to effectuate an intimate mixing of the components and, thus, the formulation of the elastomer system, which is then coated onto the desired substrate via the spray gun.

In one embodiment of the invention, the volumetric ratio of the (A) component to the (B) component is generally from about 30 to 70 percent to about 70 to 30 percent. Preferably, component (A) and component (B) are employed in a 1:1 volumetric ratio. Advantageously, the components of the spray polyurea system react to form the polyurea elastomer without the aid of a catalyst.

The following Examples are provided to further illustrate the preferred embodiments of the present invention, but should not be construed as limiting the invention in any way.

GENERAL PROCEDURE

The polyurea spray elastomer systems, useful in railcar compartment lining applications, are prepared from high pressure, high temperature impingement mixing of a resin blend and an isocyanate component.

The isocyanate component is typically an isocyanate quasi-prepolymer of a modified methylene diisocyanate and a high molecular weight polyether polyol (either a diol or a triol). Other isocyanate monomers may be blended in as well as reactive diluents.

The resin blend is simply a blend of polyoxyalkylene diamines and/or triamines and amine-terminated aromatic chain extenders.

Pigments, adhesion promoters (the functional alkoxy silanes), UV stabilizers and antioxidants, as well as dispersion additives, may also be included.

FORMULATION EXAMPLE I

A polyurea spray elastomer system was prepared by mixing an isocyanate quasi-prepolymer, RUBINATE® 9015, with an equal volume of a resin blend: JEFFAMINE® D-2000, 57.7 pbw; JEFFAMINE® T-5000, 10.2 pbw; ETHACURE® 100, 29.2 pbw; SILQUEST® A-187, 0.8 pbw; water, 0.2 pbw; RO-3097 Kroma Red, 1.0 pbw; Tinuvin® 328, 0.4 pbw; Tinuvin® 765, 0.4 pbw; and Irganox® 1076, 0.2 pbw; in high pressure, high temperature impingement mix spray equipment. The resulting polyurea elastomer had an effective gel time of 2.0 secs. with a tack free time of less than 10 secs. Formulation information is presented in Table 1, with elastomeric physical property data shown in Table 2.

This elastomer system was used in a test demonstration. Samples of sand blasted steel substrates were coated to evaluate the adhesion characteristics. The elastomer surface had a slight orange peel texture.

FORMULATION EXAMPLE II

A polyurea spray elastomer system was prepared by mixing an isocyanate component, a blend of RUBINATE® 9009, 90 pbw; and JEFFSOL® PC, 10 pbw, with an equal volume of a resin blend: JEFFAMINE® D-2000, 59.9 pbw; JEFFAMINE® T-5000, 5.0 pbw; ETHACURE® 100, 24.8 pbw; SILQUEST® A-187, 0.8 pbw; water, 0.3 pbw; Ti-Pure® R-900, 7.7 pbw; Thalo-Blue 85011, 2.6 pbw; Tinuvin® 328, 0.4 pbw; Tinuvin® 765, 0.4 pbw; and Irganox® 1076, 0.2 pbw; in high pressure, high temperature impingement mix spray equipment. The resulting polyurea elastomer had an effective gel time of 2.5 secs. with a tack free time of 10 secs. Formulation information is presented in Table 1, with elastomeric physical property data shown in Table 2.

This elastomer system was spray applied in a test to the inside of the B Compartment of Huntsman Chemical Corporation's JHPX 5246 railcar, used for the transportation of polystyrene beads. The resulting elastomer had an orange peel texture, as well as areas of dry spray (overspray), and was not acceptable for this type of lining application. Conventional sand blasting techniques could not remove the coating from the car. Initial elcometer adhesion was >2000 psi. The system was very flexible and abrasion resistant, hence the difficulty in sand blast removal.

FORMULATION EXAMPLE III

A polyurea spray elastomer system was prepared by mixing an isocyanate component, a blend of RUBINATE® 9272, 65 pbw; MONDUR® ML, 25 pbw; and JEFFSOL® PC, 10 pbw, with an equal volume of a resin blend: JEFFAMINE® D-2000, 49.9 pbw; JEFFAMINE® T-5000, 5.0 pbw; ETHACURE® 100, 14.0 pbw; UNILINK® 4200, 20.6 pbw; SILQUEST® A-187, 0.8 pbw; water, 0.3 pbw; Ti-Pure® R-900, 8.5 pbw; Thalo-Blue 85011, 2.1 pbw; Tinuvin® 328, 0.4 pbw; Tinuvin® 765, 0.4 pbw; and Irganox® 1076, 0.2 pbw; in high pressure, high temperature impingement mix spray equipment. The resulting polyurea elastomer had an effective gel time of 10 secs. with a tack free time of 45 secs. Formulation information is presented in Table 1, with elastomeric physical property data shown in Table 2.

This elastomer system was spray applied in a test to the inside of all four compartments of Huntsman Chemical Corporation's JHPX 5245 railcar, used for transportation of polystyrene beads. Application of the system took approximately 4 hours and this system had a very smooth surface texture. Compartment B contained some residual Formulation Example II elastomer that could not be removed. Excellent coverage and adhesion of Formulation Example III to Formulation Example II were observed.

The final inspection of the polyurea lined railcar did show some application problems with the system. There were some areas which did not receive sufficient coating and some rust bleed through was evident. These concerns were believed to be due to the application technique, rather than the chemistry of the spray polyurea elastomer system.

The polyurea coating of Formulation Example III was then removed for re-coat application using 30,000 to 60,000 psi water blast with red garnet by Specialty Lining. This was followed by sand blasting to return the approximate 2 mil blast profile to the steel substrate. This procedure took almost 24 hours.

Formulation Example III was used to coat the inside of a three-compartment practice car JHPX 3508 as well as the original four-compartment car JHPX 5246 by Specialty Lining. The application for both cars took approximately four hours. For the four compartment car, the volume of polyurea spray elastomer used can be found in Table 3. The average film thickness in each compartment was 10–15 mils. Initial elcometer adhesion (less than 2 hours after application) was 1000 psi with cohesive/adhesive failure being noted. Elcometer adhesion was greater than 2000 psi after 24 hours.

TABLE 1

POLYUREA SPRAY FORMULATIONS

| Formulation Example | I | II | III |
|---|---|---|---|
| Isocyanate, pbw | | | |
| RUBINATE ® 9015 | 100 | — | — |
| RUBINATE ® 9009 | — | 90 | — |
| RUBINATE ® 9272 | — | — | 65 |
| MONDUR ® ML | — | — | 25 |
| JEFFSOL ™ PC | — | 10 | 10 |
| NCO, % | 15.5 | 14.2 | 13.5 |
| Resin blends, pbw | | | |
| JEFFAMINE ® D-2000 | 57.7 | 59.9 | 49.9 |
| JEFFAMINE ® T-5000 | 10.2 | 5.0 | 5.0 |
| ETHACURE ® 100 | 29.2 | 24.8 | 14.0 |
| UNILINK ® 4200 | — | — | 20.6 |
| SILQUEST ® A-187 | 0.8 | 0.8 | 0.8 |
| Water | 0.2 | 0.2 | 0.3 |
| RO-3097 Kroma Red | 1.0 | — | — |
| Ti-Pure ® R-900 | — | 7.7 | 8.5 |
| Thalo-Blue 85011 | — | 2.6 | 2.1 |
| Tinuvin ® 328 | 0.4 | 0.4 | 0.4 |
| Tinuvin ® 765 | 0.4 | 0.4 | 0.4 |
| Irganox ® 1076 | 0.2 | 0.2 | 0.2 |
| Processing | | | |
| INDEX | 1.05 | 1.05 | 1.05 |
| Iso/Res volume ratio | 1.00 | 1.00 | 1.00 |
| Iso/Res weight ratio | 1.14 | 1.05 | 1.11 |
| Effective gel time, sec. | 2.0 | 2.5 | 8.0 |
| Tack free, sec. | <10 | 10 | 45 |

TABLE 2

POLYUREA SPRAY SYSTEMS ELASTOMER PHYSICAL PROPERTY DATA

| Formulation Example | I | II | III |
|---|---|---|---|
| Tensile strength, psi | 2405 | 2125 | 2145 |
| Elongation, % | 220 | 250 | 520 |
| Tear strength, pli | 370 | 390 | 430 |
| Shore D Hardness | 54 | 50 | 43 |
| 100% Modulus, psi | 1730 | 1440 | 960 |
| 300% Modulus, psi | — | — | 1450 |
| Taber ® abrasion, mg loss (1000 gms, 1000 rev, H-18 wheels) | 250 | 250 | 180 |
| Gardner Impact, in-lbs[1] | | | |
| direct | 160 | 160 | 160 |
| indirect | 160 | 160 | 160 |
| 1000 hours salt fog | | | |
| Blisters | none | none | none |
| Corrosion from scribe, mm | 4.0 | 4.0 | 4.0 |
| elcometer adhesion, psi | >2000 | >2000 | >2000 |

[1]No cracking was noted in any of the test samples, at maximum force.

[1]No cracking was noted in any of the test samples, at maximum force.

TABLE 3

POLYUREA SPRAY COVERAGE RAILCAR JHPX 5246 — FORMULATION EXAMPLE III

| Compartment | A | AC | BC | B |
|---|---|---|---|---|
| Gallons | 8.2 | 8.1 | 7.7 | 9.1 |

Polyurea spray elastomer lined railcar JHPX 5246 was next subjected to a series of loading and unloading of polystyrene beads as well as crystalline polystyrene at the Huntsman Chemical Corporation's Belpre, Ohio facility. Loading and unloading was performed by Bulk-O-Matic. In the transportation of the polyurea lined railcar from McKees Rocks, Pa. to Belpre, Ohio, no cracking of the polyurea lining at any of the weld seams or joints was noted.

Polyurea lined railcar JHPX 5246 was subjected to normal loading and unloading of off-specification polystyrene for three cycles. A 4"-diameter load line was used with 5–7 psi pressure under normal load. No damage to the polyurea elastomer, Formulation Example III, was noted. This cycle was repeated with loading angled to the lined substrate, again with no damage. Loading was then done directly at the lining for three additional cycles. Again, no damage was noted. In each case, the car unloaded without any sticking or holdup with the product inside the railcar.

This same process was repeated using 10–11 psi pressure and 13 psi pressure. No change in the polyurea lining was noted after each of the cyclings.

The same procedure was repeated using crystalline polystyrene, which tends to be highly abrasive. Loading at the 5–7 psi pressure and 10–11 psi pressure showed no change in the polyurea elastomer lining's appearance. Loading at the 13 psi pressure gave a slightly dull surface to the polyurea elastomer at the load point. The polyurea elastomer lining's integrity was still maintained. Loading at the 13 psi pressure represents 1500 lbs/hr, requiring 40 minutes to load each compartment.

FORMULATION EXAMPLE IIIb

A polyurea spray elastomer system was prepared by mixing an isocyanate component, a blend of RUBINATE® 9272, 32.5 pbw; MONDUR® 1437, 32.1 pbw; MONDUR® ML, 24.8 pbw; and JEFFSOL® PC, 10.6 pbw, with an equal volume of the resin blend from Formulation Example III (except that the Thalo-Blue 85011 was replaced by COOKSON BT-617-D); in high pressure, high temperature impingement mix spray equipment. The resulting polyurea elastomer had an effective gel time of 10 secs. with a tack free time of approximately 45 secs. Formulation information is presented in Table 3, with elastomeric physical property data shown in Table 4.

FORMULATION EXAMPLE IV

A polyurea spray elastomer system was prepared by mixing an isocyanate component, a blend of an isocyanate quasi-prepolymer, prepared from first mixing MONDUR® ML, 46 pbw with JEFFOX® PPG2000, 44 pbw; followed by addition of JEFFSOL® PC, 10 pbw; with an equal volume of a resin blend: JEFFAMINE® D-2000, 49.9 pbw; JEFFAMINE® T-5000, 5.0 pbw; ETHACURE® 100, 14.0 pbw; UNLINK® 4200, 20.6 pbw; SILQUEST® A-187, 0.8 pbw; water, 0.3 pbw; Ti-Pure® R-900, 8.8 pbw; RAVEN® 1020, 1.8 pbw; Tinuvin® 328, 0.4 pbw; Tinuvin® 765, 0.4 pbw; and Irganox® 1076, 0.2 pbw; in high pressure, high temperature impingement mix spray equipment. The resulting polyurea elastomer had an effective gel time of 9.5 secs. with a tack free time of 45 secs. Formulation information is presented in Table 3, with elastomeric physical property data shown in Table 4.

Neither Formulation Example IIIb nor Formulation Example IV were applied inside of a railcar. Both systems were used to study system reactivity and physical property performance. Formulation Example IV has been proposed as the next system for a gray color as contrasted with a previous blue system.

TABLE 4

POLYUREA SPRAY FORMULATIONS

| Formulation Example | IIIb | IV |
|---|---|---|
| Isocyanate, pbw | | |
| RUBINATE ® 9272 | 32.5 | — |
| MONDUR ® 1437 | 32.1 | — |
| MONDUR ® ML | 24.8 | 46.0 |
| JEFFOX ® PPG-2000 | — | 44.0 |
| JEFFSOL ™ PC | 10.6 | 10.0 |
| NCO, % | 13.5 | 13.5 |
| Resin blends, pbw | | |
| JEFFAMINE ® D-2000 | 49.9 | 49.9 |
| JEFFAMINE ® T-5000 | 5.0 | 5.0 |
| ETHACURE ® 100 | 14.0 | 14.0 |
| UNILINK ® 4200 | 20.6 | 20.6 |
| SILQUEST ® A-187 | 0.8 | 0.8 |
| Water | 0.3 | 0.3 |
| Ti-Pure ® R-900 | 8.5 | 8.8 |
| Thalo-Blue (COOKSON BT-617D) | 2.6 | — |
| RAVEN ® 1020 | — | 1.8 |
| Tinuvin ® 328 | 0.4 | 0.4 |
| Tinuvin ® 765 | 0.4 | 0.4 |
| Irganox ® 1076 | 0.2 | 0.2 |
| Processing | | |
| INDEX | 1.05 | 1.05 |
| Iso/Res volume ratio | 1.00 | 1.00 |
| Iso/Res weight ratio | 1.11 | 1.10 |
| Effective gel time, sec. | 10 | 9.5 |
| Tack free, sec. | 45 | 45 |

TABLE 5

POLYUREA SPRAY SYSTEMS ELASTOMER PHYSICAL PROPERTY DATA

| Formulation Example | IIIb | IV |
|---|---|---|
| Tensile strength, psi | 2145 | 1535 |
| Elongation, % | 520 | 555 |
| Tear strength, pli | 430 | 320 |
| Shore D Hardness | 43 | 41 |
| 100% Modulus, psi | 960 | 750 |
| 300% Modulus, psi | 1450 | 1105 |
| 1000 hours salt fog | | |
| Blisters | none | none |
| Corrosion from scribe, mm | 4.0 | 4.5 |
| elcometer adhesion, psi | >2000 | >1500* |

*cohesive elastomer failure

PHYSICAL PROPERTY TESTING

Physical property testing for the polyurea spray elastomer systems noted herein were done in accordance with American Society for Testing and Materials (ASTM). The ASTM test methods and their physical property test descriptions are given below:

| | |
|---|---|
| ASTM D-638/D-412 | Tensile strength, elongation, 100% and 300% modulus |
| ASTM D-624 | Tear strength |
| ASTM D-2240 | Shore Hardness (A & D) |
| ASTM D-2794 | Gardner Impact Test |
| ASTM D-4060 | Taber ® Abrasion |
| ASTM D-4541 | Elcometer adhesion |
| ASTM B-117 | Salt Fog Exposure |

FORMULATION EXAMPLE V

A slow cure, hand mixable polyurea elastomer system, useful for brush-on applications, was prepared by mixing an isocyanate compound as disclosed in Formulation Example III, with an equal volume of a resin blend, JEFFAMINE® D-2000, 36.2 pbw; JEFFAMINE® T-5000, 4.0 pbw; UNILINK® 4200, 49.2 pbw; SILQUEST® A-187, 0.8 pbw; Ti-Pure® R-900, 8.8 pbw; Thalo-Blue 85011, 1.8 pbw; Tinuvin® 328, 0.8 pbw; Tinuvin® 765, 0.4 pbw; and Irganox® 1076, 0.2 pbw; in a small container for a period of 30 seconds to 1 minute. This system was then brush applied onto a steel panel. Working time for the brush application was approximately 10 minutes. Formulation information is presented in Table 6.

Formulation Example V was also applied using a 2 component cartridge/syringe with static mix tube. An example is a 50 ml ConProTech Inc., MIXPAC® 50 System, with a 5" static mix tube. After application to a steel panel, the polyurea elastomer system could then be brushed to give an even coat. Improved mixing and ease of working could be noted with the cartridge application compared to the straight hand mix.

Formulation Example V was used to pre-stripe the weld seams and hook areas inside a railcar before spray application with Formulation Example III. This work was done by Specialty Lining in McKees Rocks, Pa. Excellent coverage was noted as well as adhesion of Formulation Example V to Formulation Example III. Use of the slow cure, hand mixable Formulation Example V did not delay the coating process of the polyurea spray railcar lining concept.

TABLE 6

SLOW CURE, HAND MIXABLE POLYUREA ELASTOMER SYSTEM

| Formulation Example | V |
|---|---|
| Isocyanate, pbw | |
| RUBINATE ® 9272 | 63 |
| MONDUR ® ML | 27 |
| JEFFSOL ™ PC | 10 |
| NCO, % | 14.0 |
| Resin blend, pbw | |
| JEFFAMINE ® D-2000 | 36.2 |
| JEFFAMINE ® T-5000 | 4.0 |
| UNILINK ® 4200 | 49.2 |
| SILQUEST ® A-187 | 0.8 |
| Ti-Pure ® R-900 | 8.8 |
| Thalo-Blue 85011 | 1.8 |
| Tinuvin ® 328 | 0.4 |
| Tinuvin ® 765 | 0.4 |
| Irganox ® 1076 | 0.2 |
| Processing | |
| INDEX | 1.05 |
| Iso/Res volume ratio | 1.00 |
| Iso/Res weight ratio | 1.11 |

Spray Application

For spray application, a GUSMER high pressure, high temperature proportioning unit, either a Marksman or H-3500, was used. This was fitted with a GUSMER GX-7 400 series impingement mix spray gun through 100 feet of dual heated, high pressure hose. For processing, the block temperature was set at 160° F. for both the isocyanate component and the resin blend component. Hose temperature was set at 160° F. for both components. Processing was at 2500 static pressure, 2000 psig spray pressure.

The system of this invention, using a high 2,4'-MDI isomer content, functional alkoxy silane adhesion promoter and alkylene carbonate, in a preferred embodiment, gives an excellent spray polyurea elastomer using 100% solids with no VOC emission concerns. The combination of the particular high 2,4'-MDI isomer content and an alkylene carbonate allows for slower initial system viscosity build and slower reactivity. This allows realization of thinner application film builds, similar to a solvented epoxy paint. The high 2,4'-MDI isomer content also gives improved flexibility to the elastomer without significant loss of surface hardness. This can be observed by comparing Example III which employed MONDUR® ML (high 2,4'-MDI isomer content, approximately 56%) and RUBINATE® 9272 (having a 2,4'-isomer content of about 50%) with Examples I and II, which use isocyanates having considerably lower 2,4'-MDI isomer content (please see the Glossary). ISONATE® 50 O,P' could also be used in place of MONDUR ML. ISONATE 50 O,P' is a liquid, modified isocyanate with a 50% 2,4'-isomer content.

From the results presented above, it may be seen that the spray polyurea elastomer system of this invention finds utility in railcar and tank lining applications. The system provides polyurea elastomer linings quickly to increase turn-around time for the railcar in the lining process; i.e. cars are back in service sooner. Additionally, the polyurea lining permits faster loading of the cars with product, since the lining is more durable and able to withstand faster loading procedures. Further, the polyurea elastomer linings have a high degree of impact and abrasion resistance. The use of functional alkoxy silanes provides polyurea elastomer linings with improved adhesion.

Many modifications may be made in the process of this invention without departing from the spirit and scope thereof which are defined only in the appended claims. For example, one skilled in the art may discover that a certain combination or proportion of ingredients may give a polyurea elastomer with particular advantages, or that certain functional alkoxy silanes are better than others at improving adhesion.

GLOSSARY

| | |
|---|---|
| COOKSON BT-617-D | Thalo-blue pigment available from Cookson. |
| ETHACURE ® 100 | Diethyltoluene diamine chain extender available from Albemarle ™ Corporation. |
| Irganox ® 1076 | Antioxidant available from Ciba-Geigy Corp. |
| JEFFAMINE ® D-2000 | A 2000 molecular weight polyoxypropylene diamine available from Huntsman Petrochemical Corporation. |
| JEFFAMINE ® T-5000 | A 5000 molecular weight polyoxypropylene triamine available from Huntsman Petrochemical Corporation. |
| JEFFOX ® PPG-2000 | A 2000 molecular weight polyoxypropylene glycol available from Huntsman Petrochemical Corporation. |
| JEFFSOL ™ PC | Propylene carbonate available from Huntsman Petrochemical Corporation. |
| MONDUR ® 1437 | An isocyanate quasi-prepolymer based on a uretonimine modified MDI and a high molecular weight polyether polyol. This product has an isocyanate content of 10%, with 56% of the MDI as the 2,4'-isomer, and is available from Bayer Corp. |
| MONDUR ® ML | A uretonimine modified liquid MDI with a high 2,4'-isomer content, approximately 56%. This product has an isocyanate content of 33% and is available from Bayer Corp. |
| RAVEN ® 1020 | Carbon black available from Columbia Chemicals. |
| RO-3097 Kroma Red | Red iron oxide pigment available from Pfizer, Inc. |
| RUBINATE ® 9009 | An isocyanate quasi-prepolymer based on a uretonimine modified MDI and a high molecular weight polyether polyol. This product has an isocyanate content of 15.8%, has a 2,4'-isomer content of less than 10%, and is available from ICI Polyurethanes. |
| RUBINATE ® 9015 | An isocyanate quasi-prepolymer based on a uretonimine modified MDI and a high molecular weight polyether polyol. This product has an isocyanate content of 15.5%, has a 2,4'-isomer content of less than 10%, and is available from ICI Polyurethanes. |
| RUBINATE ® 9272 | An isocyanate quasi-prepolymer based on a uretonimine modified MDI and a high molecular weight polyether polyol. This product has an isocyanate content of 8.0%, with approximately 50% of the MDI as the 2,4'-isomer, and is available from ICI Polyurethanes. |
| SILQUEST ® A-187 | Functional alkoxy silane available from OSi Specialties, Inc./Witco. |
| Thalo-Blue 85011 | Blue pigment available from Peer Chemical. |
| Tinuvin ® 328 | UV stabilizer available from Ciba-Geigy Corp. |
| Tinuvin ® 765 | UV stabilizer available from Ciba-Geigy Corp. |
| Ti-Pure ® R-900 | Rutile titanium dioxide available from E. I. DuPont de Nemours Co. |
| UNILINK ® 4200 | Dialkyl substituted methylene dianiline chain extender available from UOP Chemical Co. |

We claim:

1. A spray polyurea elastomer comprising a reaction product of:

a quasi-prepolymer formed from
an isocyanate and
an active hydrogen-containing material;

at least one amine resin;

at least one amine-terminated chain extender;

water; and a functional alkoxy silane wherein the functional alkoxy silane is an adhesion promoter of formula:

$$R_n Si(OR')_{(4-n)} \qquad (I)$$

where:

R is a hydrocarbon moiety containing an epoxy group;

n is an integer from 1 to 3, although it will be recognized the in a mixture of functional alkoxy silanes n may average from 1 to 3; and R' is a straight chain alkyl group having 1 to 4 carbon atoms.

2. The polyurea elastomer system of claim 1 where in the polyurea elastomer the amine resin is an amine-terminated polyoxyalkylene polyol.

3. The polyurea elastomer of claim 1 where in the quasi-prepolymer of the polyurea elastomer the isocyanate is selected from the group of isocyanates consisting of aliphatic isocyanates selected from the group consisting of hexamethylene diisocyanate; a bifunctional monomer of tetraalkyl xylene diisocyanate; cyclohexane diisocyanate; 1,12-dodecane diisocyanate; 1,4-tetramethylene diisocyanate; isophorone diisocyanate; and dicyclohexylmethane diisocyanate;

aromatic isocyanates selected from the group consisting of m-phenylene diisocyanate; p-phenylene diisocyanate; polymethylene polyphenylene diisocyanate; 2,4-toluene diisocyanate; 2,6-toluene diisocyanate; dianisidine diisocyanate; bitolylene diisocyanate; naphthalene-1,4-diisocyanate; and diphenylene 4,4'-diisocyanate; and aliphatic/aromatic diisocyanates, selected from the group consisting of xylylene-1,3-diisocyanate; bis(4- isocyanatophenyl)methane; bis(3-methyl-4-isocyanatophenyl)methane; and 4,4'-diphenylpropane diisocyanate;

and mixtures thereof.

4. The polyurea elastomer of claim 1 where in the polyurea elastomer the amine-terminated chain extender is selected from the group consisting of an aliphatic, cycloaliphatic or aromatic diamine chain extender.

5. The elastomer of claim 1 wherein the silane is present in an amount in the range of from about 0.1 pbw to about 0.5 pbw, based on the total spray polyurea elastomer.

6. The elastomer of claim 3, wherein R' is methyl or ethyl.

7. The elastomer of claim 1 wherein the isocyanate comprises methylene diisocyanate and at least 30% of the methylene diisocyanate is the 2,4'-isomer thereof.

8. The elastomer of claim 1 further comprising an alkylene carbonate.

9. The elastomer of 1 where the active hydrogen-containing material is selected from the group consisting of a polyol, a polyoxyalkyleneamine or a combination thereof.

10. A spray polyurea elastomer prepared from:
    a quasi-prepolymer formed from
        an isocyanate comprising methylene diisocyanate and at least 30% of the methylene diisocyanate is the 2,4'-isomer thereof, and
        an active hydrogen-containing material;
    at least one amine resin;
    at least one amine-terminated chain extender;
    water; and
    from about 0.1 pbw to about 0.5 pbw, based on the total spray polyurea elastomer of at least one functional alkoxy silane as an adhesion promoter, wherein the functional alkoxy silane is an adhesion promoter of formula:

$$R_nSi(OR')_{(4-n)} \qquad (I)$$

where:
    R is a hydrocarbon moiety containing an epoxy group;
    n is an integer from 1 to 3, although it will be recognized in a mixture of functional alkoxy silanes n may average from 1 to 3; and
    R' is a straight chain alkyl group having 1 to 4 carbon atoms.

11. The polyurea elastomer system of claim 10 where in the polyurea elastomer the amine resin is an amine-terminated polyoxyalkylene polyol.

12. The polyurea elastomer system of claim 10 wherein the amine resin further comprises an amine resin blend of at least two amine-terminated polyoxyalkylene polyols.

13. The polyurea elastomer of claim 10 where in the quasi-prepolymer of the polyurea elastomer the isocyanate is selected from the group of isocyanates consisting of
    aliphatic isocyanates selected from the group consisting of hexamethylene diisocyanate; a bifunctional monomer of tetraalkyl xylene diisocyanate; cyclohexane diisocyanate; 1,12-dodecane diisocyanate; 1,4-tetramethylene diisocyanate; isophorone diisocyanate; and dicyclohexylmethane diisocyanate;
    aromatic isocyanates selected from the group consisting of m-phenylene diisocyanate; p-phenylene diisocyanate; polymethylene polyphenylene diisocyanate; 2,4-toluene diisocyanate; 2,6-toluene diisocyanate; dianisidine diisocyanate; bitolylene diisocyanate; naphthalene-1,4-diisocyanate; and diphenylene 4,4'-diisocyanate; and
    aliphatic/aromatic diisocyanates, selected from the group consisting of xylylene-1,3-diisocyanate; bis(4-isocyanatophenyl)methane; bis(3-methyl-4-isocyanatophenyl)methane; and 4,4'-diphenylpropane diisocyanate;
    and mixtures thereof.

14. The polyurea elastomer of claim 10 where in the polyurea elastomer the amine-terminated chain extender is selected from the group consisting of an aliphatic, cycloaliphatic or aromatic diamine chain extender.

15. A spray polyurea elastomer comprising a composition formulated from:
    a quasi-prepolymer formed from
        an isocyanate comprising methylene diisocyanate and at least 30% of the methylene diisocyanate is the 2,4'-isomer thereof, and
        an active hydrogen-containing material;
    at least one amine resin;
    at least one amine-terminated chain extender;
    an alkylene carbonate selected from the group consisting of ethylene carbonate, propylene carbonate, butylene carbonate, and dimethyl carbonate;
    water; and
    from about 0.1 pbw to about 0.5 pbw, based on the total spray polyurea elastomer of at least one functional alkoxy silane as an adhesion promoter, wherein the functional alkoxy silane is an adhesion promoter of formula:

$$R_nSi(OR')_{(4-n)} \qquad (I)$$

where:
    R is a hydrocarbon moiety containing an epoxy group;
    n is an integer from 1 to 3, although it will be recognized the in a mixture of functional alkoxy silanes n may average from 1 to 3; and
    R' is a straight chain alkyl group having 1 to 4 carbon atoms.

16. The elastomer of claim 15 wherein the silane is an epoxy alkoxy silane and wherein R' is methyl or ethyl.

17. The elastomer of claim 15 wherein the amine-terminated chain extender is an aliphatic, cycloaliphatic or aromatic diamine chain extender.

* * * * *